US012230197B2

(12) United States Patent
Mercier

(10) Patent No.: US 12,230,197 B2
(45) Date of Patent: Feb. 18, 2025

(54) DISPLAY PIXEL COMPRISING LIGHT-EMITTING DIODES FOR A DISPLAY SCREEN

(71) Applicant: Aledia, Echirolles (FR)

(72) Inventor: Frédéric Mercier, Coublevie (FR)

(73) Assignee: Aledia, Echicrolles (FR)

( * ) Notice: Subject to any disclaimer, the term of this patent is extended or adjusted under 35 U.S.C. 154(b) by 0 days.

(21) Appl. No.: 18/716,888

(22) PCT Filed: Dec. 8, 2022

(86) PCT No.: PCT/EP2022/084909
§ 371 (c)(1),
(2) Date: Jun. 5, 2024

(87) PCT Pub. No.: WO2023/110604
PCT Pub. Date: Jun. 22, 2023

(65) Prior Publication Data

US 2024/0428723 A1 Dec. 26, 2024

(30) Foreign Application Priority Data

Dec. 14, 2021 (FR) ...................................... 2113487

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2330/023* (2013.01)

(58) Field of Classification Search
CPC ... G09G 2300/0842; G09G 2300/0426; G09G 2330/023; G09G 3/32
See application file for complete search history.

(56) References Cited

U.S. PATENT DOCUMENTS 11,164,506 B2 11/2021 Hugon et al.
2021/0110758 A1 4/2021 Rossini et al.
(Continued)

FOREIGN PATENT DOCUMENTS

WO WO 2018/185433 A1 10/2018

OTHER PUBLICATIONS

International Search Report and Written Opinion for International Application No. PCT/EP2022/084909, mailed Mar. 3, 2023.

*Primary Examiner* — Muhammad N Edun
(74) *Attorney, Agent, or Firm* — Wolf, Greenfield & Sacks, P.C.

(57) ABSTRACT

A display pixel including a light-emitting diode, a circuit for driving the light-emitting diode, and first, second, third, and fourth conductive pads. The light-emitting diode is powered with a first voltage received between the first and second pads. The driver circuit controls the light-emitting diode based on first and second binary signals. The first signal is received between the third and second pads and alternates between a second voltage lower than the first voltage, and a third voltage, lower than the second voltage. The second signal is received between the fourth and second pads and alternates between the second voltage and the third voltage. The display pixel comprises a circuit for delivering a power supply voltage of the driver circuit, based on the first and second signals.

21 Claims, 6 Drawing Sheets

(56) References Cited

U.S. PATENT DOCUMENTS

| | | | | |
|---|---|---|---|---|
| 2021/0256898 | A1 | 8/2021 | Kim | |
| 2021/0343231 | A1 | 11/2021 | Gray et al. | |
| 2021/0407417 | A1* | 12/2021 | Dong | G09G 3/3291 |
| 2022/0246094 | A1* | 8/2022 | Qin | G09G 3/3266 |

* cited by examiner

DISPLAY PIXEL COMPRISING LIGHT-EMITTING DIODES FOR A DISPLAY SCREEN

This application is a national stage filing under 35 U.S.C. § 371 of International Patent Application Serial No. PCT/EP2022/084909, filed Dec. 8, 2022, which claims priority to French patent application FR21/13487, filed Dec. 14, 2021. The contents of these applications are incorporated herein by reference in their entirety.

TECHNICAL BACKGROUND

The present disclosure generally concerns display pixels comprising light-emitting diodes for a display screen.

PRIOR ART

A pixel of an image corresponds to the unit element of the image displayed by a display screen. For the display of color images, a display screen generally comprises, for the display of each pixel of the image, at least three components, also called display sub-pixels, which each emit a light radiation substantially in a single color (for example, red, green, and blue). The superposition of the radiations emitted by the three display sub-pixels provides the observer with the colored sensation corresponding to the pixel of the displayed image. In this case, the assembly formed by the three display sub-pixels used for the display of a pixel of an image is called display pixel of the display screen. Each display sub-pixel may comprise a light source, particularly a light-emitting diode.

The display pixels may be distributed in an array, each display pixel being located at the intersection of a row (or line) and of a column of the array. Generally, each row of display pixels is successively selected, and the display pixels of the selected row are programmed to display the desired image pixels.

An active array is a screen drive architecture enabling to maintain all the pixel rows active for the entire duration of an image, conversely to arrays called passive, where each row is only active for a time T=Tframe/N (where Tframe is the duration of the image and N is the number of rows of the screen). This enables to increase the luminosity of the display screen. Further, it is possible to send low voltage or current levels onto the array control lines, which enables to display more significant data flows.

In the context of a screen based on light-emitting diodes of micrometer-range dimensions formed on electronic circuits, the size of the light-emitting diode circuit is generally smaller than the size of the image pixel due to the high intrinsic luminosity of light-emitting diodes. One of the solutions used thus is to deposit these unit light-emitting diodes on a support (also called slab) containing the drive electronics. Another solution comprises using display pixels comprising light-emitting diodes and a circuit for controlling the light-emitting diodes. It is then spoken of smart pixels. This particularly enables to simplify the forming of an active array, since the control electronics of the light-emitting diodes of the display pixel is for the most part embedded on the display pixel. Document WO 2018/185433 describes an example of a smart pixel.

For a smart pixel, the number of conductive pads of the smart pixel, used for the electric connection of the smart pixel to the support, imposes the dimensions of the smart pixel, particularly due to the minimum size of these pads and to the minimum space to be provided between these pads. To limit the number of conductive pads, it is known to deliver a single power supply voltage to the display pixels, and each display pixel internally generates one or a plurality of decreased power supply voltages, particularly for the biasing of components of the control electronics.

The static power consumption of a display pixel corresponds to the electric power consumed by the display pixel when the latter emits no light. It may be formed of the leakage currents of components or currents necessary to the internal operation of the display pixel control circuit. In the context of smart pixels, a significant part of the static power consumption originates from the generation of power supply voltages internally to the smart pixel.

It may be envisaged to provide an additional conductive pad, on each smart pixel, to supply the smart pixel with the decreased power supply voltage so that it is not generated within the smart pixel. However, this may cause an increase in the dimensions of the smart pixel, which is not desirable.

The tendency is to the increase of the number of display pixels of the display screen. The static power consumption of the display pixels may then become a critical factor. Indeed, for a so-called 4K display screen having a resolution of 2,160 by 3,840 display pixels, the static power consumption of the display screen may be greater than 150 W.

There is a need to decrease the static power consumption of the display screen.

SUMMARY OF THE INVENTION

An object of an embodiment is to provide a display screen comprising light-emitting diodes overcoming all or part of the disadvantages of existing display screens comprising light-emitting diodes.

Another object of an embodiment is for the display pixels to have dimensions smaller than 200 μm, which limits the number of interconnections between the display pixel and the support of the display pixels.

An embodiment provides a display pixel for a display screen, comprising at least one light-emitting diode, a circuit for driving the light-emitting diode, and first, second, third, and fourth electrically-conductive pads, the light-emitting diode being powered with a first voltage received between the first and second electrically-conductive pads, the driver circuit being configured to control the light-emitting diode from first and second binary signals, the first binary signal being received between the third and second electrically-conductive pads, the first binary signal alternating between a second voltage, lower than the first voltage, and a third voltage, lower than the second voltage, the second binary signal being received between the fourth and second electrically-conductive pads, the second binary signal alternating between the second voltage and the third voltage, the display pixel further comprising a circuit for delivering a power supply voltage, equal to within 10% to the second voltage, for the powering of the driver circuit, based on the first and second binary signals.

This advantageously enables to generate the decreased power supply voltage within the display pixel while decreasing the static power consumption of a display pixel since the generation of the decreased power supply voltage is not performed from the first power supply voltage of the light-emitting diode within each display pixel.

According to an embodiment, the circuit for delivering the power supply voltage comprises a first switch coupling the third electrically-conductive pad and a node of delivery of the power supply voltage, and a second switch coupling the fourth electrically-conductive pad and said node. The structure of the power supply voltage delivery circuit is thus simple.

According to an embodiment, the circuit for delivering the power supply voltage comprises a first circuit for controlling the first switch configured to control the turning on of the first switch when the first binary signal is at the second voltage and to control the turning off of the first switch when the first binary signal is at the third voltage, and a second circuit for controlling the second switch configured to control the turning off of the second switch when the second binary signal is at the third voltage. The power supply voltage of the driver circuit is thus obtained in priority from the first binary signal, as soon as the latter is at the second voltage.

According to an embodiment, the second circuit for controlling the second switch is configured to control the turning on of the second switch when the second binary signal is at the second voltage and the first binary signal is at the third voltage and the turning off of the second switch when the first binary signal is at the second voltage. The power supply voltage of the driver circuit is thus obtained from the second binary signal, only when the first binary signal is at the third voltage or at the second voltage.

According to an embodiment, the first switch is a first MOS transistor and the second switch is a second MOS transistor. This enables to easily form the power supply voltage delivery circuit in integrated fashion.

According to an embodiment, the gate of the first MOS transistor is connected to the third electrically-conductive pad and the gate of the second MOS transistor is connected to the fourth electrically-conductive pad. The control of the first and second MOS transistors is directly performed by the first and second binary signals, which simplifies the circuit for delivering the power supply voltage.

According to an embodiment, the circuit for delivering the power supply voltage comprises a capacitor having a first plate connected to said node and a second plate coupled to the second electrically-conductive pad. This enables to ensure the delivery of a substantially constant power supply voltage even when the first and second binary signals are both at the third voltage.

According to an embodiment, the circuit for delivering the power supply voltage comprises no capacitor having a plate connected to said node. The power supply voltage delivery circuit then has a particularly simple structure.

According to an embodiment, the driver circuit is configured to determine a digital signal from the values of the second binary signal received during each of first pulses of the first binary signal at the second voltage and to control the light-emitting diode based on the digital signal. The first binary signal is advantageously used to clock the driver circuit for the acquisition of the values of the second binary signal.

According to an embodiment, the driver circuit is configured to determine a digital signal from the values of the second binary signal received during each of first pulses of the first binary signal at the third voltage and to control the light-emitting diode based on the digital signal. The first pulses of the binary signal at the third voltage enable to clock the driver circuit for the acquisition of the values of the second binary signal, which advantageously enables to deliver the first binary signal at the second voltage between the first pulses.

According to an embodiment, the driver circuit is configured to determine a digital signal from the values of the second binary signal received just after each of first pulses of the first binary signal at the third voltage and to control the light-emitting diode based on the digital signal. This enables to deliver the second binary signal at the second voltage during the first pulses.

According to an embodiment, the driver circuit is configured to control the light-emitting diode by pulse width modulation based on the digital signal. This enables to control the light-emitting diode at its optimum operating point.

According to an embodiment, the display pixel only comprises the first, second, third, and fourth electrically-conductive pads. The number of conductive pads of the display pixel is advantageously decreased.

According to an embodiment, the driver circuit is configured to turn on or turn off the light-emitting diode at the rate of second pulses of the first binary signal at the second voltage or at the third voltage. The first binary signal is advantageously used to clock the driver circuit for the control of the light-emitting diode.

An embodiment also provides a display screen comprising an array of display pixels such as previously defined, the display screen further comprising circuits for delivering, for each display pixel, the first voltage between the first and second electrically-conductive pads, the first binary signal between the third and second electrically-conductive pads, and the second binary signal on the fourth electrically-conductive pad.

An embodiment also provides a method of controlling a display screen comprising an array of display pixels such as previously defined, the method comprising the delivery, for each display pixel, of the first voltage between the first and second electrically-conductive pads, the delivery of the first binary signal between the third and second electrically-conductive pads, and the delivery of the second binary signal on the fourth electrically-conductive pad. A decreased number of signals/voltages thus is to be delivered to each display pixel for the control and the power supply of the display pixel.

According to an embodiment, the method comprises the delivery of the first binary signal and of the second binary signal such that, in operation, the ratio of the average duration for which at least one of the first binary signal and of the second binary signal is at the second voltage to the sum of the average duration for which the first binary signal and the second binary signal are at the third voltage and of the average duration for which at least one of the first binary signal and of the second binary signal is at the second voltage is greater than 75%. This advantageously enables to deliver a power supply voltage internally to the display pixel, which is stable.

According to an embodiment, the method comprises the delivery of the first binary signal and of the second binary signal such that, at any time in operation, at least one of the first binary signal and of the second binary signal is at the second voltage. This advantageously enables, for each display pixel, to deliver a power supply voltage internally to the display pixel, which is stable without requiring using a condensation within the display pixel.

According to an embodiment, the method comprises, for each display pixel, the delivery of first pulses of the first binary signal at the second voltage, and the driver circuit of said display pixel is configured to determine a digital signal from the values of the second binary signal received during each of the first pulses of the first binary signal at the second voltage and to control the light-emitting diode based on the digital signal. The first binary signal is advantageously used to clock the driver circuit for the control of the light-emitting diode.

According to an embodiment, the method comprises, for each display pixel, the delivery of first pulses of the first binary signal at the third voltage, and the driver circuit of said display pixel is configured to determine a digital signal from the values of the second binary signal received during each of the first pulses of the first binary signal at the third voltage and to control the light-emitting diode based on the digital signal. The first pulses of the binary signal at the third voltage enable to clock the driver circuit for the acquisition of the values of the second binary signal, which advantageously enables to deliver the first binary signal at the second voltage between the first pulses.

According to an embodiment, the method comprises, for each display pixel, the delivery of first pulses of the first binary signal at the third voltage, and the driver circuit is configured to determine a digital signal from the values of the second binary signal received just after each of the first pulses of the first binary signal at the third voltage and to control the light-emitting diode based on the digital signal. This enables to deliver the second binary signal at the second voltage during the first pulses.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings or to a display screen in a normal position of use.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Further, there is called "binary signal" a signal which alternates between a first constant state, for example, a low state, noted "0", and a second constant state, for example, a high state, noted "1". The high and low states of different binary signals of a same electronic circuit may be different. In practice, the binary signals may correspond to voltages which may not be perfectly constant in the high or low state.

Further, in the following description, there are called "power terminals" of an insulated gate field-effect transistor, or MOS transistor, the source and the drain of the MOS transistor.

Further, unless indicated otherwise, when it is spoken of a voltage at a conductive pad, the difference between the potential at said conductive pad and a reference potential, for example, the ground, taken as equal to 0 V, is considered.

Further, it is here considered that the terms "insulating" and "conductive" respectively signify "electrically insulating" and "electrically conductive".

Unless specified otherwise, the expressions "around", "approximately", "substantially" and "in the order of" signify within 10%, and preferably within 5%.

Figure 1:
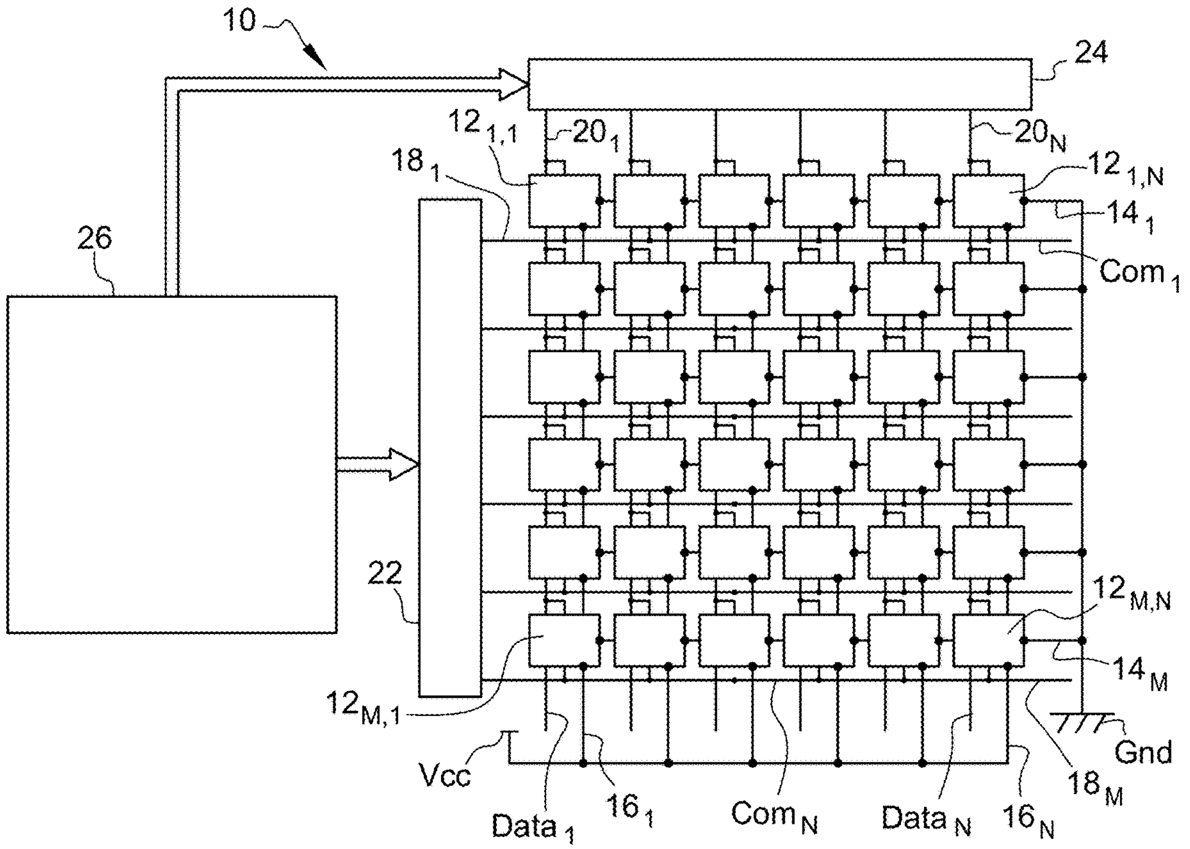
FIG. 1 partially and schematically shows an example of a display screen.

FIG. 1 partially and schematically shows a known example of a display screen 10. Display screen 10 comprises display pixels $\mathbf{12}_{i,j}$, for example, arranged in M rows and in N columns, M being an integer varying from 1 to 8,000 and N being an integer varying from 1 to 16,000, i being an integer varying from 1 to M, and j being an integer varying from 1 to N. As an example, in FIG. 1, M and N are equal to 6. Each display pixel $\mathbf{12}_{i,j}$ is coupled to a source of a low reference potential Gnd, for example, the ground, via an electrode $\mathbf{14}_i$ and to a source of a high reference potential Vcc via an electrode $\mathbf{16}_j$. As an example, electrodes $\mathbf{14}_i$ are shown as being aligned along the rows in FIG. 1 and electrodes $\mathbf{16}_j$ are shown as being aligned along the columns in FIG. 1, the reverse layout being possible. The power supply voltage of the display screen corresponds to the voltage between high reference potential Vcc and low reference potential Gnd, and is noted Vcc like the high reference potential. Power supply voltage Vcc particularly depends on the arrangement of the light-emitting diodes and on the technology according to which the light-emitting diodes are manufactured. As an example, power supply voltage Vcc may be in the order of from 4 V to 5 V.

For each row, the display pixels $\mathbf{12}_{i,j}$ in the row are coupled to a row electrode $\mathbf{18}_i$. For each column, the display pixels $\mathbf{12}_{i,j}$ in the column are coupled to a column electrode $\mathbf{20}_j$. Display screen 10 comprises a selection circuit 22 coupled to row electrodes $\mathbf{18}_i$ and adapted to delivering a selection and timing signal $Com_i$ on each row electrode $\mathbf{18}_i$. Display screen 10 comprises a data delivery circuit 24 coupled to column electrodes $\mathbf{20}_j$ and adapted to delivering a data signal $Data_j$ on each column electrode $\mathbf{20}_j$. Selection circuit 22 and control circuit 24 are controlled by a circuit 26, for example comprising a processor.

Figure 2:
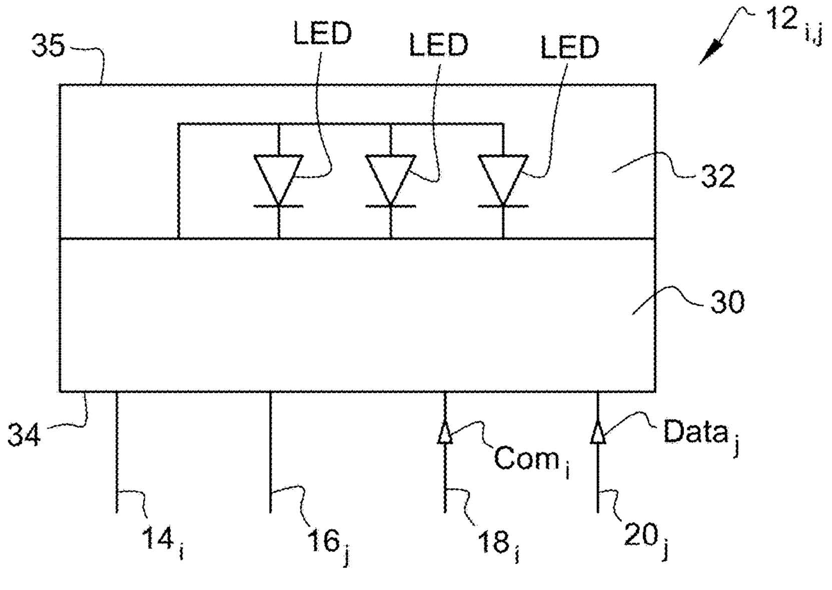
FIG. 2 is a very simplified cross-section view of an example of a display pixel.
Figure 3:
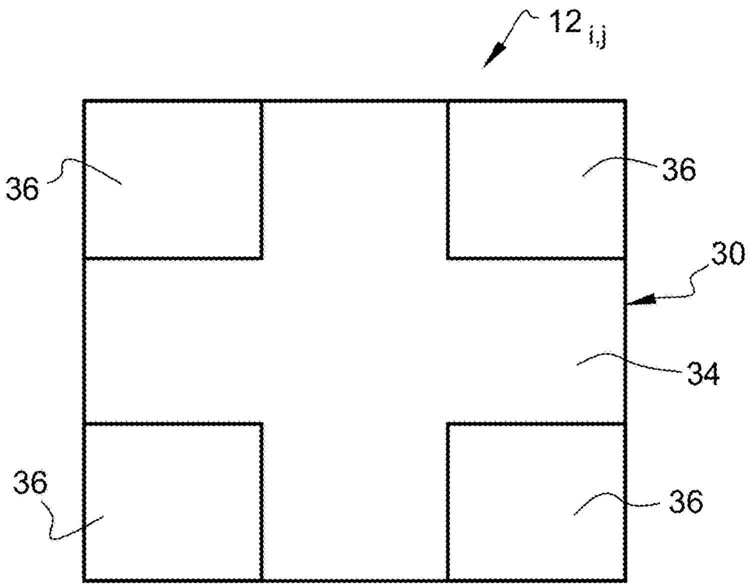
FIG. 3 is a bottom view of the display pixel of FIG. 2.

FIG. 2 is a very simplified cross-section view of a known example of display pixel $\mathbf{12}_{i,j}$ and FIG. 3 is a bottom view of display pixel $\mathbf{12}_{i,j}$. Each display pixel $\mathbf{12}_{i,j}$ comprises a control circuit 30 covered with a display circuit 32. Display circuit 32 comprises at least one light-emitting diode LED, preferably at least three light-emitting diodes LED. The display pixel comprises a lower surface 34 and an upper surface 35 opposite to lower surface 34, surfaces 34 and 35 being preferably planar and parallel. Control circuit 30 further comprises conductive pads 36, not shown in FIG. 2, on lower surface 34. Control circuit 30 may correspond to an integrated circuit comprising electronic components, particularly insulated gate field effect transistors, also called MOS transistors, or thin film transistors, also called TFTs. Preferably, display circuit 32 only comprises light-emitting diodes LED and the conductive elements of these light-emitting diodes LED and control circuit 30 comprises all the electronic components necessary for the control of the light-emitting diodes LED of display circuit 32. As a variant, display circuit 32 may also comprise other electronic components in addition to light-emitting diodes LED. Light-emitting diodes LED may be 2D light-emitting diodes, also called planar light-emitting diodes, comprising a stack of planar layers, or 3D light-emitting diodes, each comprising a three-dimensional semiconductor element covered with an active area. In FIG. 2, light-emitting diodes LED are shown as being connected with a common anode. It may however be desirable to arrange light-emitting diodes LED according to another configuration. As an example, light-emitting diodes LED may be connected with a common cathode, or be connected independently from one another.

According to an embodiment, display pixel $\mathbf{12}_{i,j}$ comprises three display sub-pixels emitting light at first, second, and third wavelengths. According to an embodiment, the first wavelength corresponds to blue light and is within the range from 430 nm to 490 nm. According to an embodiment, the second wavelength corresponds to green light and is within the range from 510 nm to 570 nm. According to an embodiment, the third wavelength corresponds to red light and is within the range from 600 nm to 720 nm.

Each conductive pad 36 is intended to be connected to one of the electrodes $\mathbf{14}_i$, $\mathbf{16}_j$, $\mathbf{18}_i$, $\mathbf{20}_j$ schematically shown in FIG. 2. A first conductive pad 36 is coupled to the source of low reference potential Gnd. A second conductive pad is coupled to the source of high reference potential Vcc. A third conductive pad 36 is coupled to row electrode 18; and receives selection and timing signal $Com_i$. A fourth conductive pad 36 is coupled to column electrode $\mathbf{20}_j$ and receives data signal $Data_j$. The dimensions of conductive pads 36 and the layout of conductive pads 36 on surface 34 are particularly imposed by the rules of design of display pixel $\mathbf{12}_{i,j}$ and by the method of assembly of display pixels $\mathbf{12}_{i,j}$ in display screen 10.

Figure 4:
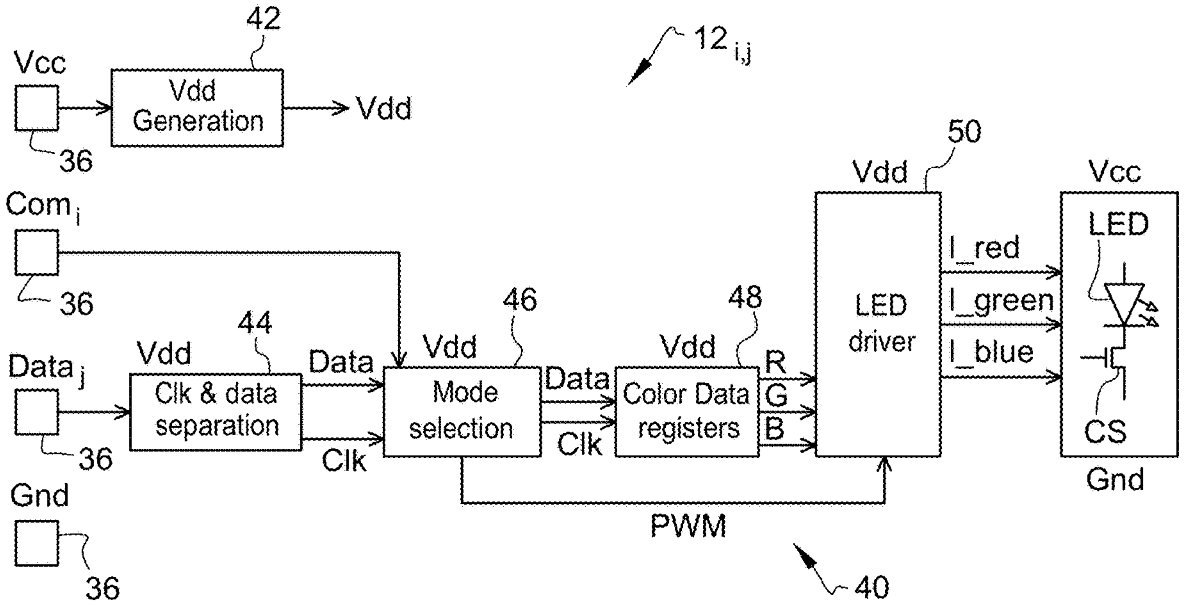
FIG. 4 shows an example of block diagram of the display pixel of FIG. 2.

FIG. 4 shows an example of a block diagram of a display pixel $\mathbf{12}_{i,j}$ of display screen 10. In FIG. 4, there has been indicated, above each block, the power supply voltage used to power the electronic components of the blocks.

According to an example, display pixel $\mathbf{12}_{i,j}$ comprises at least three light-emitting diodes, a single light-emitting diode LED being shown in FIG. 4. Each light-emitting diode LED is coupled in series with a controllable current source CS, for example comprising a MOS transistor. In the present example, for each light-emitting diode LED, the anode of light-emitting diode LED is for example coupled to the conductive pad 36 receiving high reference potential Vcc and the cathode of light-emitting diode LED is for example coupled to a terminal of controllable current source CS, the other terminal of controllable current source CS being coupled to the conductive pad 36 receiving low reference potential Gnd.

Display pixel $\mathbf{12}_{i,j}$ further comprises a circuit 40 for driving controllable current source CS. Driver circuit 40 may particularly comprise electronic components such as MOS transistors. It may be desirable to use a low power supply voltage, lower than 4 V, for example in the order of 1 V or of 1.8 V, to power the electronic components of driver circuit 40, this low power supply voltage for example corresponding to the voltage likely to be applied between the power terminals of the MOS transistors. For this purpose, display pixel $\mathbf{12}_{i,j}$ comprises a circuit 42 (Vdd Generation) for delivering, based on power supply voltage Vcc, a decreased power supply voltage Vdd particularly used for the power supply of driver circuit 40. Circuit 42 for example comprises a voltage divider.

According to an embodiment, detection and timing signal $Com_i$, received at one of the conductive pads 36 of each display pixel $\mathbf{12}_{i,j}$, is a binary signal alternating between a low state "0" and a high state "1", the low state corresponding to low reference potential Gnd and the high state "1" corresponding to a low voltage, substantially equal to decreased power supply voltage Vdd. Data signal $Data_j$ is a binary signal alternating between a low state "0" and high state "1", the low state corresponding to low reference potential Gnd and the high state "1" corresponding to a low voltage, substantially equal to decreased power supply voltage Vdd.

Driver circuit 40 comprises a circuit 44 (Clk & data separation) coupled to the conductive pad 36 receiving data signal $Data_j$ and delivering, based on data signal $Data_j$, a clock signal Clk and data Data. Driver circuit 40 comprises a circuit 46 (Mode selection) receiving signals Clk and Data, coupled to the conductive pad 36 receiving selection and timing signal $Com_i$, and configured to deliver signals Clk and Data to a storage circuit 48 (Color Data registers) or to deliver a PWM signal to a circuit 50 (LED driver) for controlling the controllable current source CS associated with each light-emitting diode LED. Storage circuit 48 is configured to store color signals R, G, B representative of the image pixel to be displayed. Circuit 50 is adapted to controlling the controllable current sources CS coupled to light-emitting diodes LED with signals I_red, I_green, and I_blue, obtained from the R, G, B color signals, and from signal PWM.

As will be described hereafter, to limit the number of conductive pads 36 per display pixel $\mathbf{12}_{i,j}$, data signals $Data_j$ allow both the determination, by each display pixel $\mathbf{12}_{i,j}$, of a clock signal and of the R, G, B color signals representative of the light intensities desired for the radiations at the first, second, and third wavelengths. According to another embodiment, clock signal Clk is obtained from selection and timing signal $Com_i$.

The static power consumption of display pixel $\mathbf{12}_{i,j}$ is for a significant part due to electronic components other than the MOS transistors of driver circuit 40, particularly the circuit 42 for delivering decreased power supply voltage Vdd. The current tendency is to increase the number of display pixels $\mathbf{12}_{i,j}$ of display screen 10. The static power consumption of the display pixels may then become a critical factor. Indeed, for a so-called 4K display screen 10, having a resolution of 2,160 by 3,840 display pixels, the static power consumption of display screen 10 may be greater than 150 W.

It may be envisaged to provide an additional conductive pad 36, on each display pixel $\mathbf{12}_{i,j}$ in addition to those shown in FIG. 3, to supply display pixel $\mathbf{12}_{i,j}$ with an additional high reference potential Vdd, so that decreased power supply voltage Vdd is not generated within display pixel $\mathbf{12}_{i,j}$. However, it may be impossible to add an additional conductive pad 36 without increasing the lateral dimensions of display pixel $\mathbf{12}_{i,j}$, which may not be desirable.

According to an embodiment according to the invention, decreased voltage Vdd is generated from signals $Com_i$ and data signals $Data_j$. Thereby, the total number of conductive pads 36 is not modified. Further, the generation of decreased power supply voltage Vdd is no longer performed from Vcc within each display pixel $\mathbf{12}_{i,j}$ and the static power consumption of the display screen is decreased. Further, the lateral dimensions of display pixels $\mathbf{12}_{i,j}$ may be unmodified.

Figure 5:
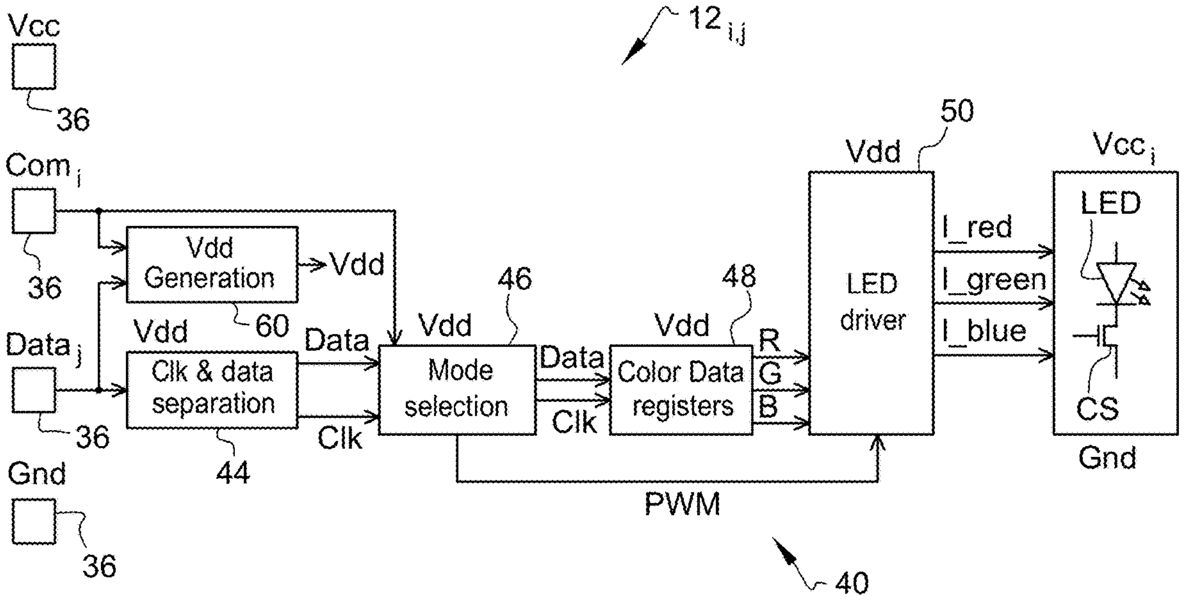
FIG. 5 shows a block diagram of an embodiment according to the invention of a display pixel of the display screen of FIG. 1.

FIG. 5 shows a block diagram of an embodiment of a display pixel $\mathbf{12}_{i,j}$. The display pixel $\mathbf{12}_{i,j}$ of FIG. 5 has the same structure as the display pixel $\mathbf{12}_{i,j}$ shown in FIG. 4, with the difference that circuit 42 for delivering decreased power supply voltage Vdd is replaced with a circuit 60 for delivering decreased power supply voltage Vdd receiving selection and timing signal $Com_i$ and data signal $Data_j$.

Figure 6:
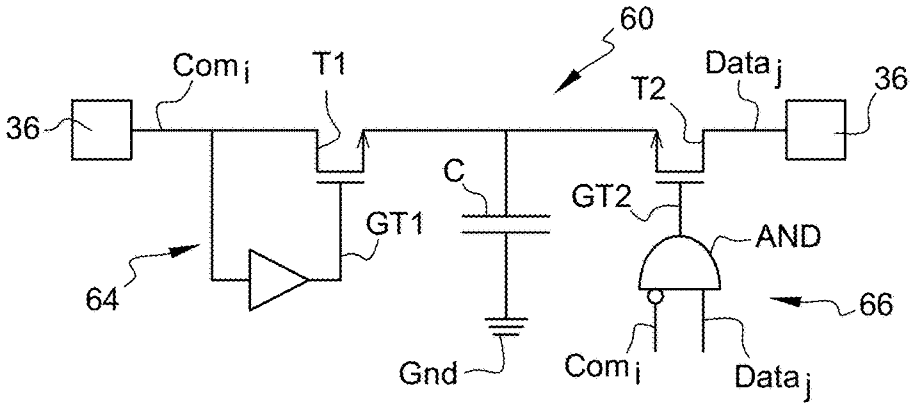
FIG. 6 shows a block diagram of an embodiment of a circuit for delivering a decreased voltage of the display pixel of FIG. 5.

FIG. 6 shows a block diagram of an embodiment of the circuit 60 for delivering decreased power supply voltage Vdd of the display pixel $\mathbf{12}_{i,j}$ of FIG. 5. Circuit 60 comprises a first switch T1 coupling the conductive pad 36 receiving selection and timing signal $Com_i$ to a node Q of delivery of decreased power supply voltage Vdd and a second switch T2 coupling the conductive pad 36 receiving data signal $Data_j$ to node Q. Circuit 60 comprise a circuit 64 for delivering a signal GT1 for controlling switch T1 and a circuit 66 for delivering a signal GT1 for controlling switch T1. Circuit 60 comprises a capacitor C having a plate coupled, preferably connected, to node Q, and a second plate coupled to the conductive pad 36 receiving low reference signal Gnd. Node Q corresponds to the output of circuit 60 for delivering decreased voltage Vdd.

Switch T1 is on when selection and timing signal $Com_i$ is at state "1", that is, at voltage Vdd, and switch T1 is off when selection and timing signal $Com_i$ is at state "0", for example, equal to 0 V. When switch T1 is on, capacitor C is charged by voltage Vdd via switch T1. The turning off of switch T1 when selection and timing signal $Com_i$ is at state "0" prevents a discharge of capacitor C by switch T1. Switch T2 may be on when data signal $Data_j$ is at state "1", that is, at voltage Vdd, and switch T2 is off when data signal $Data_j$ is at state "0", for example, equal to 0 V. When switch T2 is on, capacitor C is charged with voltage Vdd via switch T2. The turning off of switch T2 when data signal $Data_j$ is at state "0" prevents a discharge of capacitor C by switch T2.

Each switch T1, T2 may correspond to a MOS transistor, for example, to an N-channel MOS transistor having its source coupled, preferably connected, to node Q. Signal GT1 then corresponds to the voltage for controlling the gate of transistor T1 and signal GT2 corresponds to the voltage for controlling the gate of transistor T2.

In the embodiment illustrated in FIG. 6, circuit 64 comprises a buffer circuit having its input receiving signal $Com_i$ and having its output delivering signal GT1. Circuit 64 copies at its output the signal $Com_i$ received as an input. Circuit 66 comprises an AND logic gate having a first input receiving data signal $Data_j$, having a second input receiving the inverse of selection and timing signal $Com_i$, and having its output delivering signal GT2. Thereby, when selection and timing signal $Com_i$ is at state "1", that is, at voltage Vdd, transistor T1 is on and transistor T2 is off. Capacitor C is then charged with voltage Vdd via switch T1. When selection and timing signal $Com_i$ is at state "0", for example, equal to 0 V, and data signal $Data_j$ is at state "1", that is, at voltage Vdd, transistor T1 is off and transistor T2 is on. Capacitor C is then charged with voltage Vdd via switch T2. When selection and timing signal $Com_i$ is at state "0", for example, equal to 0 V, and data signal $Data_j$ is at state "0", for example, equal to 0 V, transistor T1 is off and transistor T2 is off. Capacitor C does not discharge via transistor T1 and transistor T2.

Capacitor C is thus charged to decreased voltage Vdd as soon as one of selection and timing signal $Com_i$ or of data signal $Data_j$ is at state "1". This enables to use a capacitor C having a decreased capacitance, for example, in the range from 10 fF to 10 pF.

Figure 7:
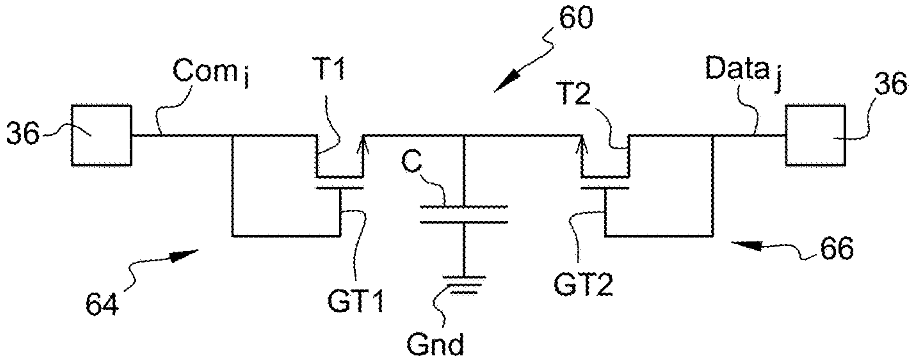
FIG. 7 shows a block diagram of another embodiment of the circuit for delivering the decreased voltage of the display pixel of FIG. 5.

FIG. 7 shows a block diagram of another embodiment of circuit 60 for delivering decreased voltage Vdd of the display pixel $\mathbf{12}_{i,j}$ of FIG. 5. The circuit 60 shown in FIG. 7 comprises all the elements of the circuit 60 shown in FIG. 6, with the difference that circuit 64 corresponds to a conductive track connecting the gate of transistor T1 to the drain of transistor T1, transistor T1 being thus diode-assembled, and that circuit 66 corresponds to a conductive track connecting the gate of transistor T2 to the drain of transistor T2, transistor T2 thus being diode-assembled. The embodiment of FIG. 7 is, advantageously, more responsive than the embodiment of FIG. 6.

According to another embodiment, circuit 64 is not present and switch T1 corresponds to a diode having its anode coupled, preferably connected, to the conductive pad 36 receiving selection and timing signal $Com_i$ and having its cathode coupled, preferably connected, to node Q. According to another embodiment, circuit 66 is not present and switch T2 corresponds to a diode having its anode coupled, preferably connected, to the conductive pad 36 receiving data signal $Data_j$ and having its cathode coupled, preferably connected, to node Q.

Figure 8:
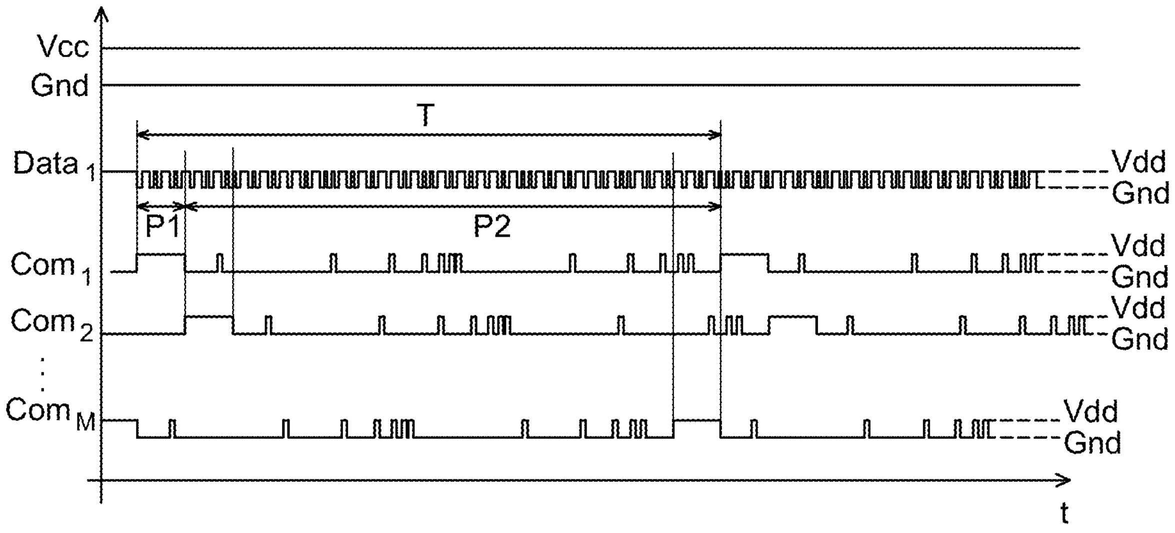
FIG. 8 shows examples of timing diagrams of signals of the display pixel of FIG. 5 according to an embodiment of an operating method of the display screen.

FIG. 8 shows a timing diagram of signals received by display pixels $\mathbf{12}_{i,j}$ having the structure shown in FIG. 5 for an embodiment of a method of displaying an image on display screen 10.

Potentials Vcc and Gnd are substantially constant. The image pixels of a new image to be displayed are successively displayed from the row of rank 1 to the row of rank M. Call frame duration T the duration separating two successive selections of the same row of display screen 10. Timing diagrams of signals $Com_1$ and $Data_1$ will be detailed for the row of rank 1, knowing that the timing diagrams of signals $Com_i$ are similar to the timing diagram of signal $Com_1$, although shifted in time. The display of a new image pixel by a display pixel $\mathbf{12}_{1,j}$, with j varying from 1 to N, of the row of rank 1 comprises a first phase P1 followed by a second phase P2. During phase P1, data signals $Data_j$ are transmitted to each display pixel $\mathbf{12}_{1,j}$ of the row of rank 1, only signal $Data_1$ being shown in FIG. 8. During second phase P2, the light-emitting diodes of each display pixel $\mathbf{12}_{1,j}$ are controlled from the R, G, B color signals, determined based on data signals $Data_j$.

During first phase P1, selection and timing signal $Com_1$ is set to state "1". The setting to state "1" of signal $Com_1$ for a long duration is detected by the circuit 46 of each display pixel $\mathbf{12}_{1,j}$ of the row of rank 1 and thus enables to select the display pixels $\mathbf{12}_{1,j}$ of this row, while the display pixels of the other rows are not selected. During first phase P1, data signals $Data_j$ are transmitted onto column electrodes $20_j$. For each display pixel $12_{1,j}$, circuit 44 determines clock signal Clk and data Data based on the pulses of data signal $Data_j$. As an example, each pulse of data signal $Data_j$ may have a first duration or a second duration, longer than the first duration. Signal Clk may correspond to a sequence of pulses of same durations having their rising edges coinciding, to within a possible constant offset, with the rising edges of the pulses of data signal $Data_j$. Data Data may correspond to a binary signal at state "0" when the pulse of signal $Data_j$ has the first duration, and at state "1" when the pulse of signal $Data_j$ has the second duration. Circuit 46, selected by signal $Com_1$ at state "1", delivers, at the rate of clock signal Clk, the data Data which are stored in circuit 50 in the form of R, G, B digital signals having their bits provided by the successive values of signal Data. The end of first period P1 for a row corresponds to the beginning of first period P1 for the next row.

According to an embodiment, the light-emitting diodes of display pixel $12_{1,j}$ are controlled by pulse-width modulation or PWM control. For this purpose, during second phase P2, selection and timing signal $Com_1$ exhibits the repetition of a succession of pulses at state "1" which are transmitted by the circuit 46 of each display pixel $12_{1,j}$ of the row of rank 1 to circuit 50 (PWM signal) to clock the operation of circuit 50 for the control of light-emitting diodes LED by pulse-width modulation. The number of pulses in the succession corresponds to the number of bits of each R, G, and B digital signal. As an example, when current source CS corresponds to a MOS transistor, this transistor is turned on or is turned off, at the rate of the PWM pulses, according to the value "0" or "1" of each bit of R, G, or B color signal, starting by the most significant bit, this transistor being maintained on or off until the next pulse of signal $Com_1$. The duration between two successive pulses of signal $Com_1$ is divided each time by two, so that the total duration for which the light-emitting diode is on depends on the value of the R, G, or B color signal. The succession of pulses of signal $Com_1$ is repeated until the next first phase P1 of the row of rank 1, a single repetition being illustrated as an example in FIG. 8.

Figure 9:
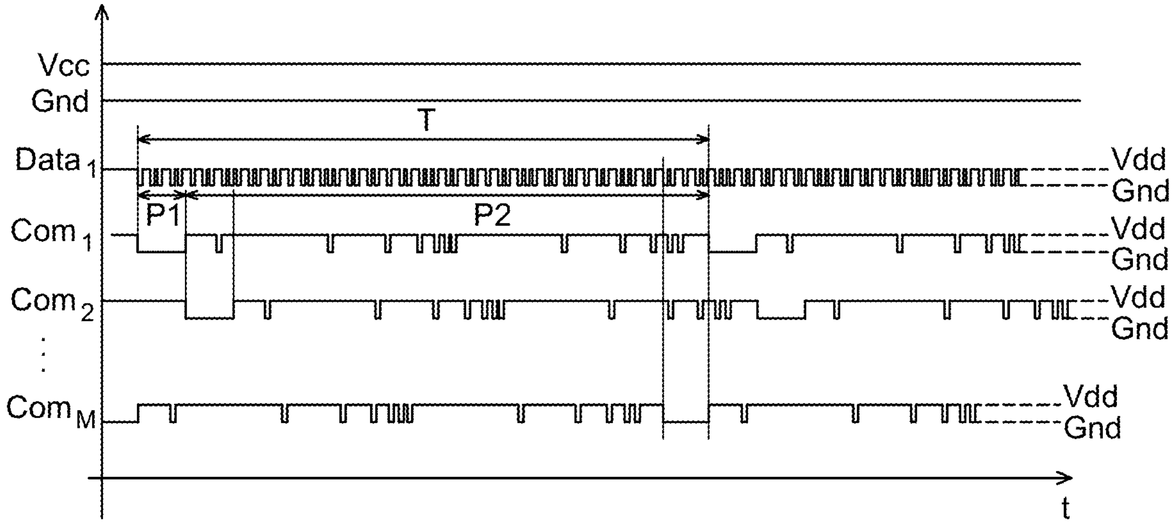
FIG. 9 shows examples of timing diagrams of signals of the display pixel of FIG. 5 according to another embodiment of an operating method of the display screen.

FIG. 9 shows a timing diagram of signals received by display pixels $12_{i,j}$ having the structure shown in FIG. 5 for another embodiment of a method of displaying an image on display screen 10.

The timing diagrams of signals Vcc, Gnd, and $Data_j$ of the embodiment illustrated in FIG. 9 may be identical to those shown in FIG. 8. The signal $Com_i$, i varying from 1 to M, of the embodiment illustrated in FIG. 9 corresponds to the complementary of the signal $Com_i$ of the embodiment illustrated in FIG. 8, that is, the signal $Com_i$, i varying from 1 to M, of the embodiment illustrated in FIG. 9 is at state "1" when the signal $Com_i$ of the embodiment illustrated in FIG. 8 is at state "0" and the signal $Com_i$ of the embodiment illustrated in FIG. 9 is at state "0" when the signal $Com_i$ of the embodiment illustrated in FIG. 8 is at state "1". For this purpose, pixel $12_{i,j}$ is configured to detect a phase P1 when signal $Com_i$ is at state "0" for a long time and the pulse width modulation or PWM control is performed during phase P2 by pulses of signal $Com_i$ at state "0".

Signal $Com_i$ is most often at state "1" in the embodiment described in relation with FIG. 9 as compared with the embodiment described in relation with FIG. 8. This advantageously enables to obtain a more frequent recharging of the capacitor C of circuit 60 for delivering decreased voltage Vdd, and thus to further decrease the capacitance of capacitor C.

Generally, according to an embodiment, the ratio of the average duration for which at least one of signal $Com_i$ and of signal $Data_j$ is at decreased voltage Vdd to the sum of the average duration for which signal $Com_i$ and signal $Data_j$ are at low reference potential Gnd and of the average duration for which at least one of signal $Com_i$ and of second signal $Data_j$ is at voltage Vdd is greater than 75%, preferably greater than 85%, more preferably greater than 95%.

According to another embodiment, selection circuit 22, control circuit 24, and circuit 26 are configured so that, for each display pixel $12_{i,j}$, there is always one of selection and timing signal $Com_i$ and of data signal $Data_j$ received by display pixel $12_{i,j}$ which is at state "1", that is, at voltage Vdd. In this embodiment, the capacitor C of circuit 60 for delivering decreased voltage Vdd may then not be present.

Figure 10:
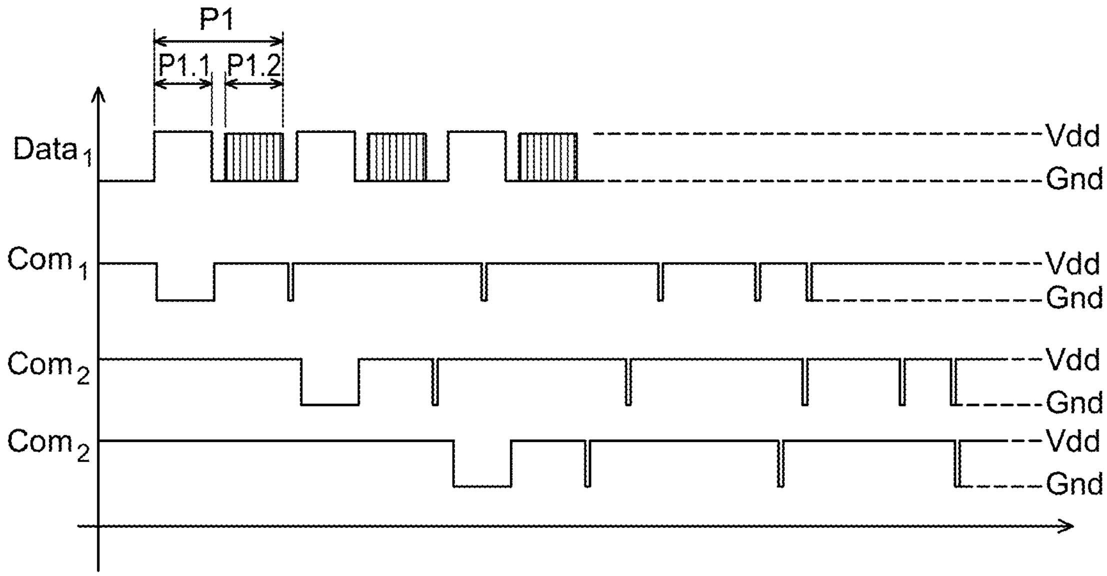
FIG. 10 shows timing diagrams of signals of the display pixel of FIG. 5 according to another embodiment of an operating method of the display screen.

FIG. 10 shows a timing diagram of signals received by display pixels $12_{i,j}$ having the structure shown in FIG. 5 for another embodiment of a method of displaying an image on display screen 10.

In FIG. 10, timing diagrams of signals $Com_1$, $Com_2$, $Com_3$ and $Dat_1$ for the rows of rank 1, 2, and 3 and the column of rank 1 have been shown, knowing that the timing diagram of the other signals $Com_i$ are similar to the timing diagram of signal $Com_1$ although shifted in time. The timing diagrams of signals Vcc, Gnd, not shown, and of the signals $Com_i$ of the embodiment illustrated in FIG. 10 may be identical to those shown in FIG. 9. The timing diagrams of the data signals $Data_j$ of the embodiment illustrated in FIG. 9 are identical to those shown in FIG. 8 with the difference that each phase P1 comprises two successive phases P1.1 and P1.2. During phase P1.1, each data signal $Data_j$, j varying from 1 to N, is held at state "1" when one of signals $Com_i$, i varying from 1 to N, is at state "0" for the long duration for the selection of the row of rank i. During the phase P1.2 which follows phase P1, data signals $Data_j$ are transmitted onto the column electrodes $20_j$ and are acquired by the display pixels $12_{i,j}$ of the row of rank i.

This embodiment is particularly adapted in the case where the capacitor C of circuit 60 for delivering decreased voltage Vdd is not present. Indeed, at any time, for each display pixel $12_{i,j}$, at least one of the signal $Com_i$ and of the data signal $Data_j$ received by display pixel $12_{i,j}$ is at state "1", so that node Q permanently delivers voltage Vdd, even if capacitor C is not present.

In the previously-described embodiments, the light-emitting diodes LED of display pixel $12_{1,j}$ are controlled by pulse-width modulation. However, the control of the light-emitting diodes LED of display pixel $12_{1,j}$ may be different from a control by pulse-width modulation. According to an embodiment, the control of light-emitting diodes LED is a current level control.

Figure 11:
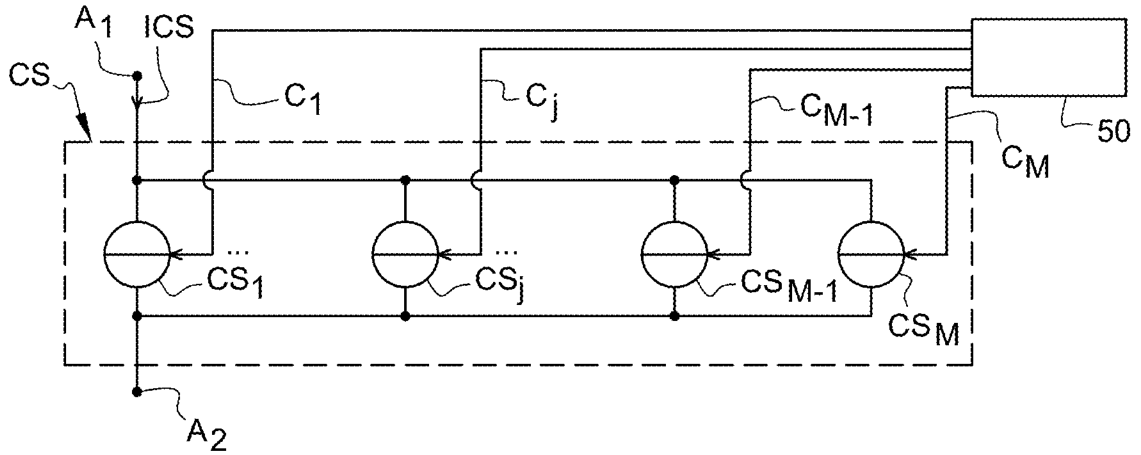
FIG. 11 shows an electric diagram of an embodiment of the current source of the display pixel of FIG. 4 or 5.

FIG. 11 shows an embodiment of current source CS where current source CS comprises N elementary controllable current sources $CS_1$ to $CS_N$, where N is an integer greater than or equal to 2. Preferably, N is equal to the number of bits of the R, G, or B digital color signal. In the present embodiment, elementary current sources $CS_j$, j varying from 1 to N, are assembled in parallel between a node $A_1$ and a node $A_2$. When the light-emitting diodes LED are assembled with a common anode, as shown in FIG. 4 or 5, for each color, node $A_1$ is coupled, preferably connected, to the cathode of the light-emitting diode LED corresponding to the considered color, and node $A_2$ is coupled, preferably connected, to the conductive pad 36 coupled to the source of low reference potential Gnd. When the light-emitting diodes LED are assembled with a common cathode, node $A_1$ is coupled, preferably connected, to the conductive pad 36 coupled to the source of high reference potential Vcc and, for each color, node $A_2$ is coupled, preferably connected, to the anode of the light-emitting diode LED corresponding to the considered color.

Each elementary current source $CS_j$ is activated or deactivated by circuit 50 by means of a control signal $C_j$. As an example, control signal $C_j$ is a binary signal corresponding to the bit of rank j of the R, G, or B digital color signal. Elementary current source $CS_j$ is off when signal $C_j$ is in a first state, for example, the low state, and current source $CS_j$ is activated when signal $C_j$ is in a second state, for example, the high state.

The larger the number of current sources $CS_j$ which are activated, the higher the intensity of current ICS. According to an embodiment, current source CS is capable of supplying a current ICS having an intensity at a level from among a plurality of constant levels and having its level depending on the number of general light-emitting diodes which are conductive. The currents supplied by the elementary current sources $CS_1$ of current source CS may be identical or different. According to an embodiment, each elementary current source $CS_j$ is capable of supplying a current of intensity I*2j−1. Current source CS is then adapted to supplying a current having an intensity ICS which may, according to control signals $C_j$, take any value k*I, with k varying from 0 to 2M−1.

According to an embodiment, the control of light-emitting diodes LED is an analog control.

Figure 12:
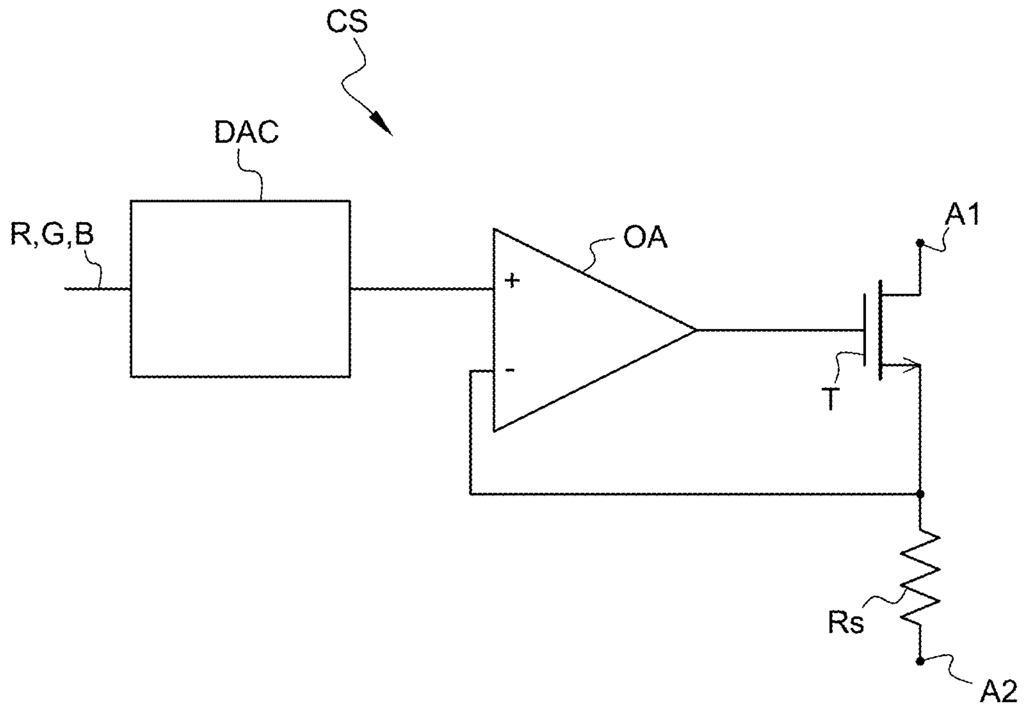
FIG. 12 shows an electric diagram of another embodiment of the current source of the display pixel of FIG. 4 or 5.

FIG. 12 shows an embodiment of current source CS where the current source comprises a MOS transistor T assembled in series with a resistor Rs between nodes $A_1$ and $A_2$, nodes $A_1$ and $A_2$ being defined as previously in relation with FIG. 11. Current source CS further comprises a digital-to-analog converter DAC receiving the R, G, or B digital color signal and an operational amplifier having its inverting input (−) coupled, preferably connected, to the midpoint between resistor Rs and the MOS transistor and having its non-inverting input (+) receiving the analog signal delivered by digital-to-analog converter DAC. Transistor T is made more or less conductive according to the R, G, or B digital color signal transmitted to digital-to-analog converter DAC.

Various embodiments and variants have been described. Those skilled in the art will understand that certain features of these various embodiments and variants may be combined, and other variants will occur to those skilled in the art. In particular, the PWM modulation may be internally generated in the control circuit 30 of display pixel $12_{i,j}$ to avoid using signal $Com_i$ to generate it. Other embodiments may also not use a PWM modulation but a linear driving of light-emitting diode LED. Other embodiments may also use other electro-optical components such as organic light-emitting diodes.

Finally, the practical implementation of the described embodiments and variations is within the abilities of those skilled in the art based on the functional indications given hereabove. In particular, as concerns the second embodiment described in FIG. 5, it may be advantageous to use SOI-type (Silicon on Insulator) structures to facilitate the management of negative voltages.

The invention claimed is:

1. Display pixel for a display screen, comprising at least one light-emitting diode, a circuit for driving the light-emitting diode, and first, second, third, and fourth electrically-conductive pads, the light-emitting diode being powered with a first voltage received between the first and second electrically-conductive pads, the driver circuit being configured to control the light-emitting diode from first and second binary signals, the first binary signal being received between the third and second electrically-conductive pads, the first binary signal alternating between a second voltage, lower than the first voltage, and a third voltage, lower than the second voltage, the second binary signal being received between the fourth and second electrically-conductive pads, the second binary signal alternating between the second voltage and the third voltage, the display pixel further comprising a circuit for delivering a power supply voltage, equal to within 10% to the second voltage, for the powering of the driver circuit, based on the first and second binary signals.

2. Display pixel according to claim 1, wherein the circuit for delivering the power supply voltage comprises a first switch coupling the third electrically-conductive pad and a node of delivery of the power supply voltage, and a second switch coupling the fourth electrically-conductive pad and said node.

3. Display pixel according to claim 2, wherein the circuit for delivering the power supply voltage comprises a first circuit for controlling the first switch configured to control the turning on of the first switch when the first binary signal is at the second voltage and to control the turning off of the first switch when the first binary signal is at the third voltage, and a second circuit for controlling the second switch configured to control the turning off of the second switch when the second binary signal is at the third voltage.

4. Display pixel according to claim 3, wherein the second circuit for controlling the second switch is configured to control the turning on of the second switch when the second binary signal is at the second voltage and the first binary signal is at the third voltage and the turning off of the second switch when the first binary signal is at the second voltage.

5. Display pixel according to claim 2, wherein the first switch is a first MOS transistor and wherein the second switch is a second MOS transistor.

6. Display pixel according to claim 2, wherein the first switch is a first MOS transistor and wherein the second switch is a second MOS transistor and wherein the gate of the first MOS transistor is connected to the third electrically-conductive pad and wherein the gate of the second MOS transistor is connected to the fourth electrically-conductive pad.

7. Display pixel according to claim 2, wherein the circuit for delivering the power supply voltage comprises a capacitor having a first plate connected to said node and a second plate coupled to the second electrically-conductive pad.

8. Display pixel according to claim 2, wherein the circuit for delivering the power supply voltage comprises no capacitor having a plate connected to said node.

9. Display pixel according to claim 1, wherein the driver circuit is configured to determine a digital signal from values of the second binary signal received relatively to first pulses of the first binary signal and to control the light-emitting diode based on the digital signal.

10. Display pixel according to claim 9, wherein the driver circuit is configured to determine a digital signal from the values of the second binary signal received during each of first pulses of the first binary signal at the second voltage, or received during each of first pulses of the first binary signal at the third voltage, or received just after each of first pulses of the first binary signal at the third voltage and to control the light-emitting diode based on the digital signal.

11. Display pixel according to claim 9, wherein the driver circuit is configured to control the light-emitting diode by pulse-width modulation based on the digital signal.

12. Display pixel according to claim 1, only comprising the first, second, third, and fourth electrically-conductive pads.

13. Display pixel according to claim 1, wherein the driver circuit is configured to turn on or turn off the light-emitting diode at the rate of second pulses of the first binary signal at the second voltage or at the third voltage.

14. Display pixel according to claim 1, wherein the first binary signal is a first binary voltage and wherein the second binary signal is a second binary voltage.

15. Display screen comprising an array of display pixels according to claim 1, the display screen further comprising circuits for delivering, for each display pixel, the first voltage between the first and second electrically-conductive pads, the first binary signal between the third and second electrically-conductive pads, and the second binary signal on the fourth electrically-conductive pad.

16. Method of controlling a display screen comprising an array of display pixels according to claim 1, the method comprising the delivery, for each display pixel, of the first voltage between the first and second electrically-conductive pads, the delivery of the first binary signal between the third and second electrically-conductive pads, and the delivery of the second binary signal on the fourth electrically-conductive pad.

17. Method according to claim 16, comprising the delivery of the first binary signal ($Com_i$) and of the second binary signal such that, in operation, the ratio of the average duration for which at least one of the first binary signal and of the second binary signal is at the second voltage to the sum of the average duration for which the first binary signal and the second binary signal are at the third voltage and of the average duration for which at least one of the first binary signal ($Com_i$) and of the second binary signal is at the second voltage is greater than 75%.

18. Method according to claim 17, comprising the delivery of the first binary signal and of the second binary signal such that, at any time in operation, at least one of the first binary signal and of the second binary signal is at the second voltage.

19. Method according to claim 16, comprising, for each display pixel, the delivery of first pulses of the first binary signal at the second voltage, and wherein the driver circuit of said display pixel is configured to determine a digital signal from the values of the second binary signal received during each of the first pulses of the first binary signal at the second voltage and to control the light-emitting diode based on the digital signal.

20. Method according to claim 16, comprising, for each display pixel, the delivery of first pulses of the first binary signal at the third voltage, and wherein the driver circuit of said display pixel is configured to determine a digital signal from the values of the second binary signal received during each of the first pulses of the first binary signal at the third voltage and to control the light-emitting diode based on the digital signal.

21. Method according to claim 16, comprising, for each display pixel, the delivery of first pulses of the first binary signal at the third voltage, and wherein the driver circuit is configured to determine a digital signal from the values of the second binary signal received just after each of the first pulses of the first binary signal ($Com_i$) at the third voltage and to control the light-emitting diode based on the digital signal.

* * * * *